(12) United States Patent
Chan

(10) Patent No.: US 7,431,851 B2
(45) Date of Patent: Oct. 7, 2008

(54) FAT SEPARATOR

(76) Inventor: David Chan, 25 Bamburg Circle, Apt. 731, Scarborough, Ontario (CA) M1W 3W2

( * ) Notice: Subject to any disclaimer, the term of this patent is extended or adjusted under 35 U.S.C. 154(b) by 44 days.

(21) Appl. No.: 11/704,220

(22) Filed: Feb. 9, 2007

(65) Prior Publication Data

US 2008/0190869 A1    Aug. 14, 2008

(51) Int. Cl.
*B01D 17/02* (2006.01)
(52) U.S. Cl. ............... 210/800; 210/467; 210/474; 210/514; 210/516; 210/538; 210/299; 210/804; 99/496; 222/547; 222/564
(58) Field of Classification Search ............ 210/299, 210/464, 466, 467, 469, 474, 498, 514, 516, 210/538, 800, 804; 99/465, 496; 222/547, 222/564
See application file for complete search history.

(56) References Cited

U.S. PATENT DOCUMENTS

| | | | | |
|---|---|---|---|---|
| 976,979 | A * | 11/1910 | Berchtold | 210/538 |
| 2,583,335 | A * | 1/1952 | Jepson | 210/514 |
| 2,795,334 | A * | 6/1957 | Wickland | 210/476 |
| 2,840,239 | A * | 6/1958 | Wethammer | 210/467 |
| 3,865,023 | A * | 2/1975 | Halvorsen | 99/495 |
| D252,068 | S * | 6/1979 | Lovely | D7/317 |
| 4,206,856 | A * | 6/1980 | Lobel et al. | 222/564 |
| 4,310,418 | A * | 1/1982 | Busbey | 210/467 |
| D268,158 | S * | 3/1983 | Doyel | D7/317 |
| 4,626,352 | A * | 12/1986 | Massey et al. | 210/469 |
| 5,653,881 | A * | 8/1997 | Bruss et al. | 210/467 |

* cited by examiner

*Primary Examiner*—Christopher Upton
(74) *Attorney, Agent, or Firm*—Gowling Lafleur Henderson LLP

(57) ABSTRACT

The present invention provides a fat separator device having a container with a spout portion and a cover portion releasably attached to the container. The cover portion including a surface having at least one aperture to allow for passage of a liquid through the cover portion and a plug portion extending down from the surface, the plug portion being operable to releasably cover the spout portion of the container.

15 Claims, 9 Drawing Sheets

FAT SEPARATOR

FIELD OF THE INVENTION

The present invention provides a fat separator device and more particularly a fat separator device including a measuring container and a cover portion.

BACKGROUND OF THE INVENTION

During cooking it is often required to separate fat from a liquid. For example, when making gravy it is usually necessary to separate a fat layer from the remaining gravy.

Traditionally such separation has been undertaken by spooning off the fat or by attempting to pour out the liquid while keeping the fat separate. Usually such separation methods result in some of the fat being included in the liquid portion. Also these methods are usually very awkward and inefficient and usually involve spills.

The present invention provides a fat separator device that allows for the separation of a liquid from fat with minimal contamination of fat in the liquid sample.

SUMMARY OF THE INVENTION

In one aspect the present invention provides a fat separator device comprising a container having a spout portion and a cover portion releasably attached to the container. The cover portion includes a surface having at least one aperture to allow for passage of a liquid through the cover portion and a plug portion extending down from the surface, the plug portion being operable to releasably cover the spout portion of the container.

In an alternative embodiment the present invention provides a fat separator comprising a container having a body including an opening and a handle portion and a spout portion. The container also includes a cover portion mountable on the container at the opening and operable to rotate therein, the cover portion comprising a surface portion having a plurality of apertures operable to allow the passage of fluid through the cover portion into the container, and a plug portion extending away from the surface, the plug portion being operable to cover the spout portion when the cover portion is mounted on the container.

In a further embodiment, the present invention provides a fat separator as described herein having an open cover portion that is operable to fit onto a container and allow for fluid to be passed therethrough.

BRIEF DESCRIPTION OF THE DRAWINGS

The present invention will be described in further detail with reference to the accompanying drawings in which.

DETAILED DESCRIPTION OF THE PREFERRED EMBODIMENTS

Figure 1:
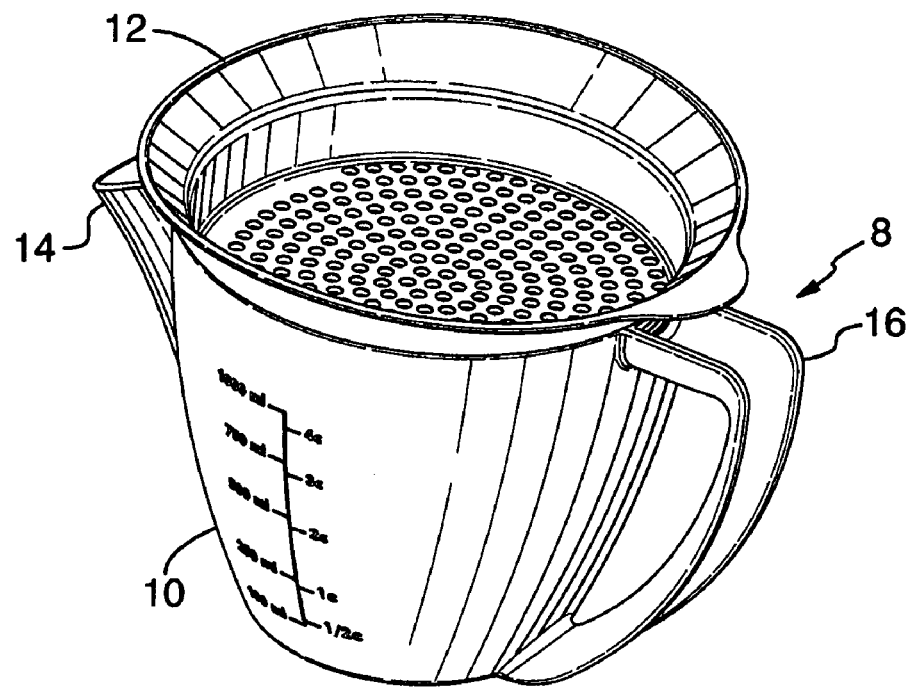
FIG. 1 is an isometric view of one embodiment of the fat separator device of the present invention comprising a lid portion and a container, viewed from the handle end of the container.
Figure 2:
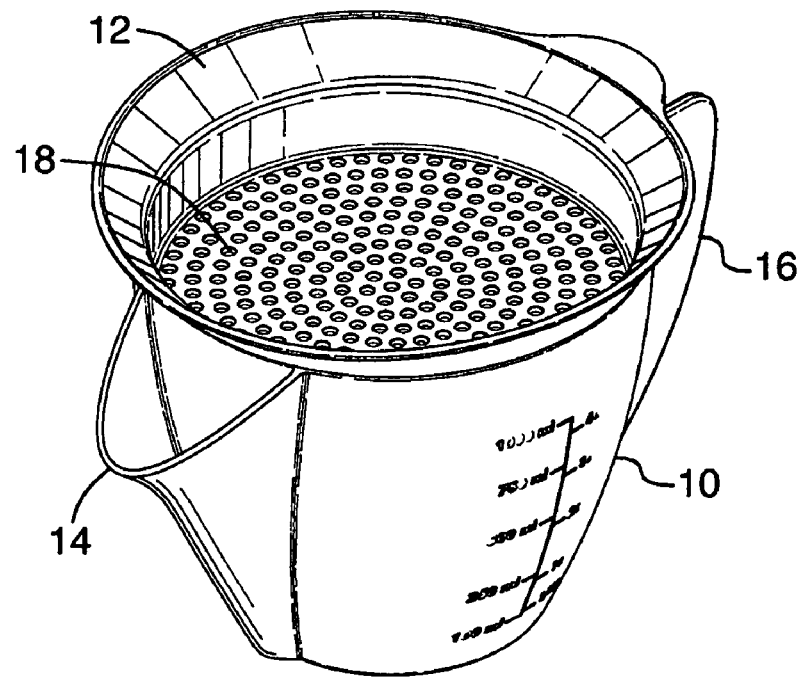
FIG. 2 is an isometric view of the fat separator device of FIG. 1 viewed from the spout end of the container.

The fat separator device of the present invention will now be described in further detail with reference to the accompanying FIGS. 1 through 14 in which the fat separator device is indicated generally at numeral 8.

The fat separator device 8 includes a container 10 and a cover portion 12 operable to releasably attach to the top of the container 10. In the embodiment illustrated in FIGS. 1 through 14 container 10 is a four cup measuring jug including a spout portion 14 and handle portion 16. However, it will be understood that the container 10 may be any form of container and is not limited to the illustrated embodiment. Preferably the container 10 has some form of pouring mechanism to allow for any liquid contained therein to be easily poured out.

As stated above, the cover portion 12 is operable to be attached to the container 10. Preferably, the cover portion 12 is received on the top open portion of the container at a position through which liquid or other material is generally received. In the illustrated embodiment, the cover portion 12 includes a plurality of apertures 18 located on its surface at a position above the opening of the container to allow liquid to be poured through the cover portion 12 when the cover portion 12 is received thereon. In one embodiment, the cover portion 12 is operable to rotate within the container 10, as will be discussed below. In an alternative embodiment, the cover portion 12 is operable to be received within the container and angled relative to the container 10, as will be discussed below.

Figure 3:
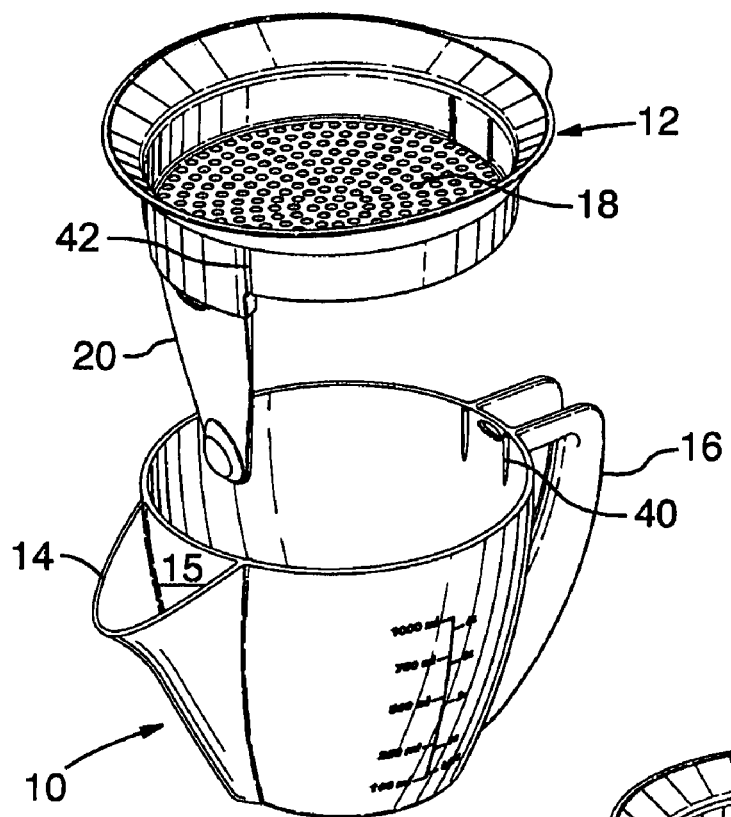
FIG. 3 is an exploded view of the fat separator device of FIG. 2.

As can be seen clearly in FIG. 3 the cover portion 12 includes a leg portion 20 extending therefrom and in a downward projection and is sized to be operable to be received within the container 10 when the cover is placed on the container. The leg portion 20 is sized to be operable to cover the internal wall portion, indicated at 15, of the container 10 adjacent the spout portion 14. It will be understood from the description, and the accompanying figures, that the container has a body portion that includes an internal surface that forms the area within which liquid may be contained and that includes internal wall portion 15. The spout portion 14 extends from the sides of the internal wall portion 15 of the internal surface of the body portion. The internal wall portion 15 will be described in further detail below.

Around the upper surface of the cover portion 12 there is a lip portion 24. The lip portion 24 provides a surrounding edge to the area of the cover portion 12 comprising the plurality of apertures 18 so that non-fluid material, may be collected within the upper surface of the cover portion 12 and captured therein and further the lip portion 24 serves to contain the liquid within an area while being poured into the container 10 to prevent any excess loss of liquid.

It will be understood that cover portion 12 may be made of any material suitable for use in the food industry. Preferably both the container 10 and cover portion 12 are made from material that is food friendly and can withstand the temperatures of a dishwasher.

Figure 9:
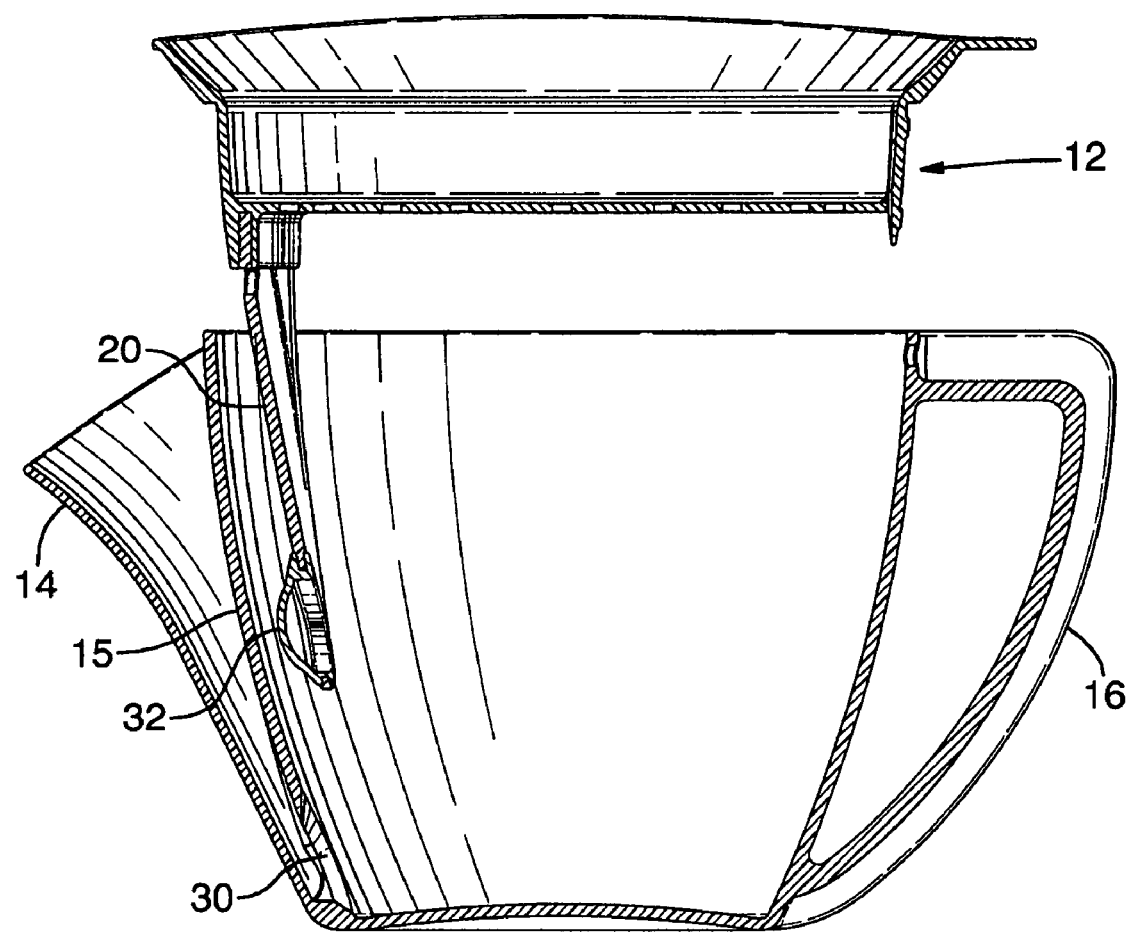
FIG. 9 is a partially exploded cross sectional view of the fat separator device of FIG. 6.
Figure 10:
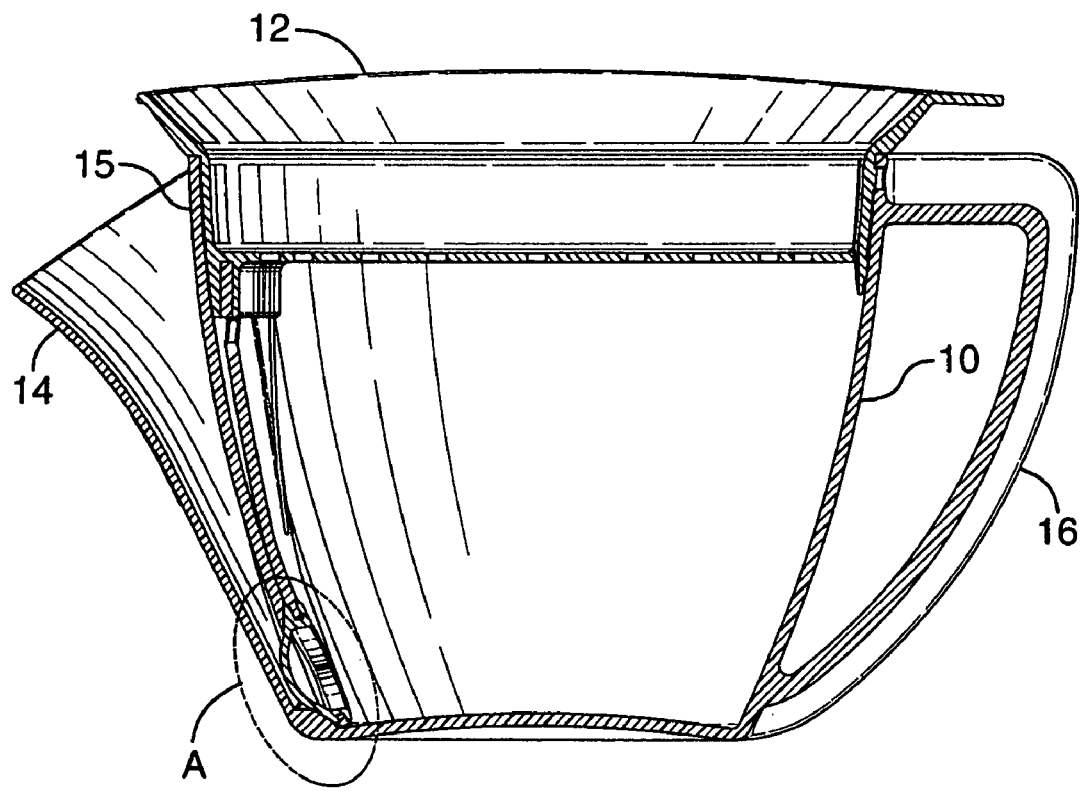
FIG. 10 is a cross sectional view of the fat separator device of FIG. 5 taken along the line 10-10.
Figure 10A:
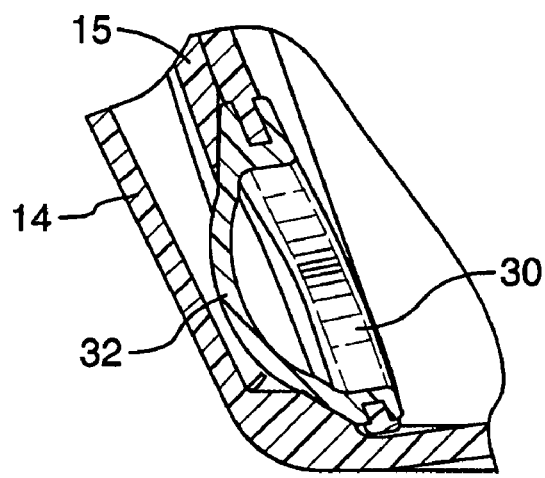
FIG. 10A is a detailed view of the portion of the fat separator device of FIG. 10 identified in circle A.
Figure 11:
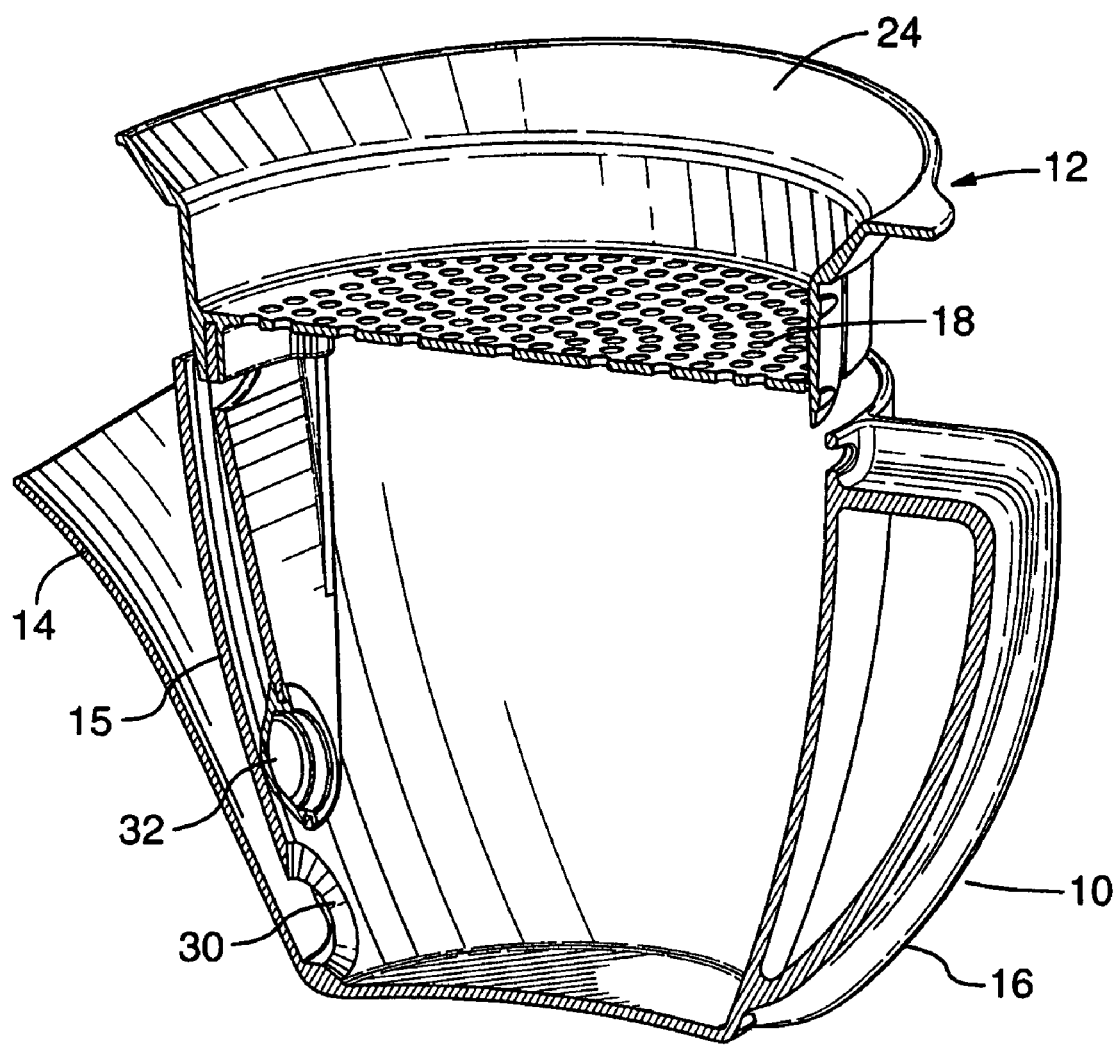
FIG. 11 is a partially exploded cross sectional perspective top view of the fat separator device of FIG. 1.

As can be seen more clearly in FIGS. 9-11, at the lower end of the internal wall portion 15 is an aperture 30 that extends through the lower end of the internal wall portion 15 to allow for fluid communication between the main body of container 10 and the spout portion 14. At the lower end of leg portion 20 of the cover portion 12 there is a protrusion 32 that is sized to be received in and cover aperture 30. When the cover portion 12 is placed on the container 10 and the leg portion 20 is aligned with internal wall portion 15 and the protrusion 32 is received in aperture 30, the flow of liquid from the main body of container 10 to the spout portion 14 is blocked. In order to allow fluid to flow between these two areas the cover portion 12 can either be rotated to remove the protrusion 32 from the aperture 30, shown in FIGS. 12 and 13, or the cover portion 12 can be tilted or flipped to an open configuration, as discussed below and illustrated in FIG. 14 or the cover portion 12 can be completely removed therefrom. FIG. 10 illustrates a configuration in which the protrusion 32 is received in the aperture 30, shown in greater detail in FIG. 10A. FIG. 11 illustrates a view of the fat separator 8 in a configuration prior to the cover portion 12 being completely received on the container 10.

Figure 4:
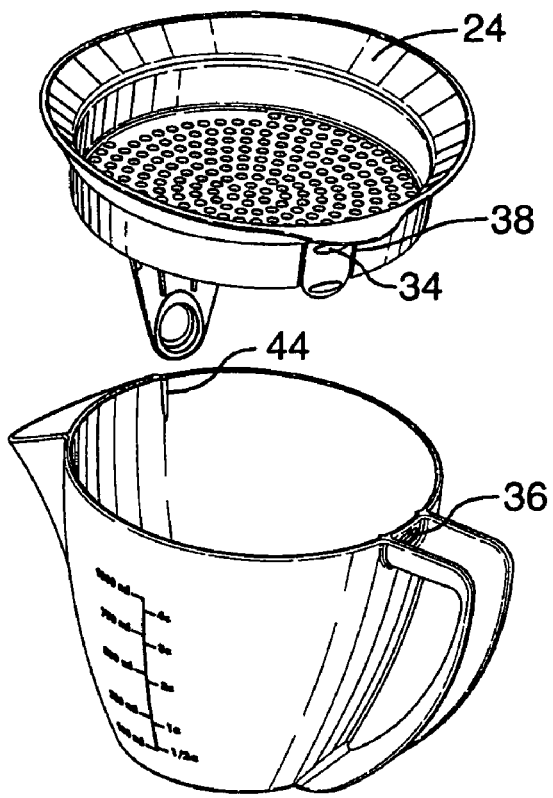
FIG. 4 is an exploded view of the fat separator device of FIG. 1.
Figure 5:
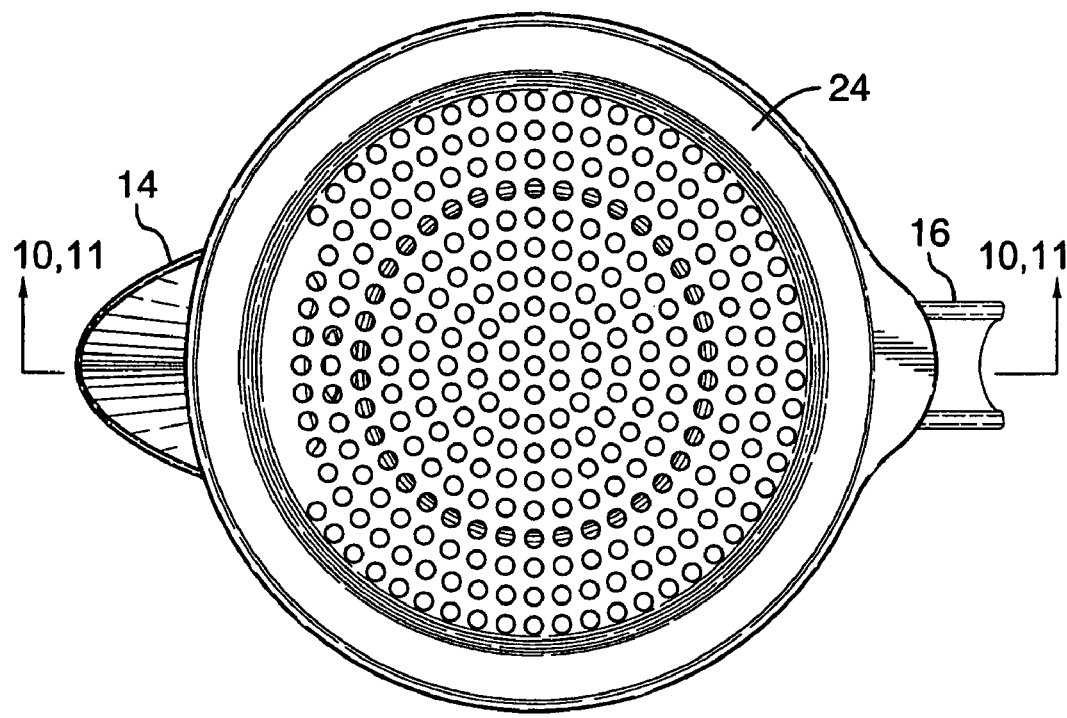
FIG. 5 is a top view of one embodiment of the fat separator device of the present invention.
Figure 6:
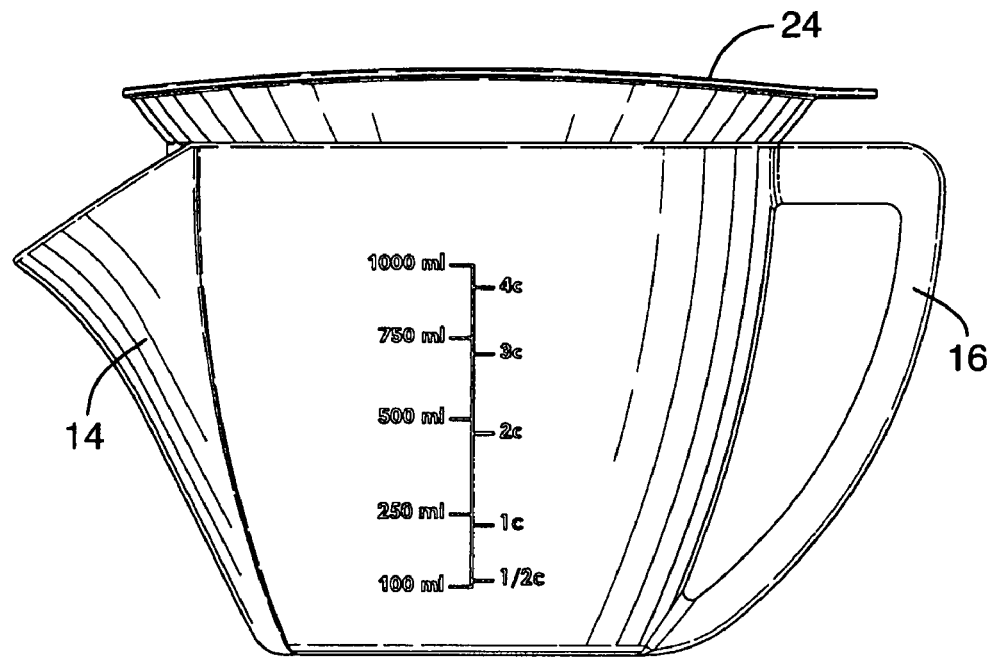
FIG. 6 is a side view of one embodiment of the fat separator device of the present invention.
Figure 7:
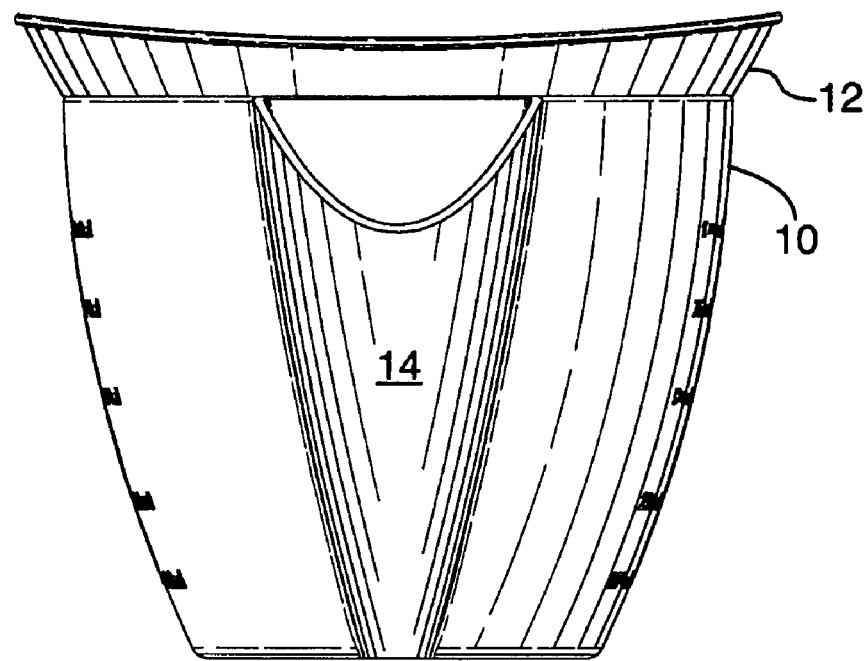
FIG. 7 is an end view of the fat separator device of FIG. 6 taken from the spout end of the container.
Figure 8:
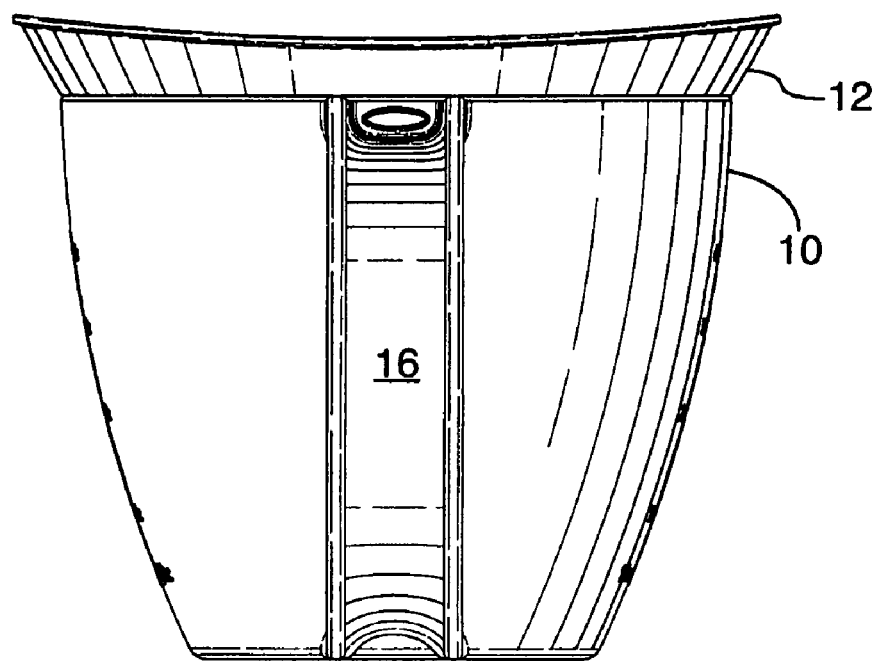
FIG. 8 is an end view of the fat separator device of FIG. 6 taken from the handle end of the container.

Located on the external wall of the cover portion 12 at the opposite side from the leg portion 20 is at least one snap fit connection, such as a projection 34, seen clearly in FIG. 4. In the illustrated embodiment two projections are shown. The projection(s) 34 correspond(s) to the size and shape of an opening 36 located on the container 10 where the upper portion of the handle portion 16 joins the container 10. The projection 34 and the opening 36 are operable to matingly engage and secure the cover portion 12 to the container 10 when aligned and engaged. In addition, the lower projection 34 assists in securing the cover portion 12 in an open configuration, as discussed in further detail below in reference to FIG. 14.

The operation of the fat separator device 8 will now be described with reference to the figures. Prior to use the cover portion 12 is placed on the container 10 and positioned so that the leg portion 20 is adjacent the internal wall 15 and the protrusion 32 covers the aperture 30 located at the lower end of internal wall 15. FIG. 11 illustrates the positioning of the cover portion 12 prior to being secured on the container. FIG. 10A illustrates the location of the protrusion 32 within the aperture 30 when the cover portion 12 is secured to the container 10.

In this configuration fluid is unable to flow from the main body of the container 10 through the aperture 30 into the spout portion 14. Once the cover portion 12 is attached to the container 10 the user may pour the liquid to be separated through the cover portion 12. The strainer portion of the cover, i.e. the area containing the plurality of apertures 18, will allow for the liquid to pass through the apertures while catching any chunks, or non-liquid material, within the surface of the cover portion 12. Once the liquid has been poured through the cover portion 12 the user allows the liquid to rest for a period of time sufficient to allow any fat contained within the liquid in the container to rise to the surface of the liquid. As an example, a sufficient amount of time may be 30 seconds. Since the protrusion 30 on the leg portion 20 of the cover 12 is received in the aperture 30 of the internal wall 15 any fat that is contained within the liquid portion located in the container 10 will be prevented from entering the spout portion 14 of the container 10.

Figure 12:
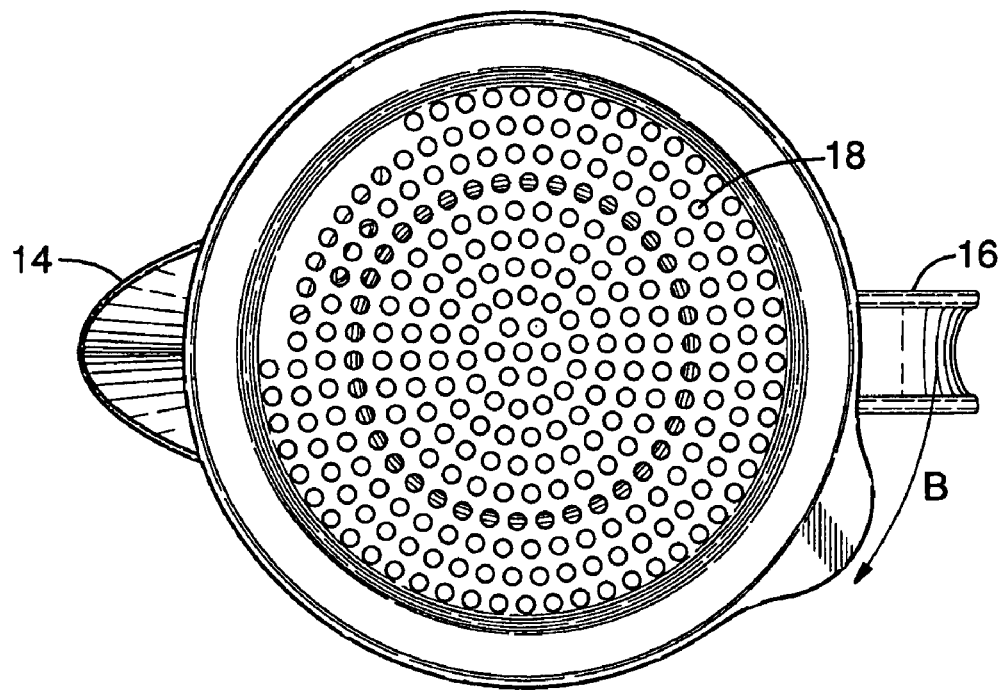
FIG. 12 is a top view of the fat separator device of FIG. 1 showing the cover portion in a first open configuration.
Figure 13:
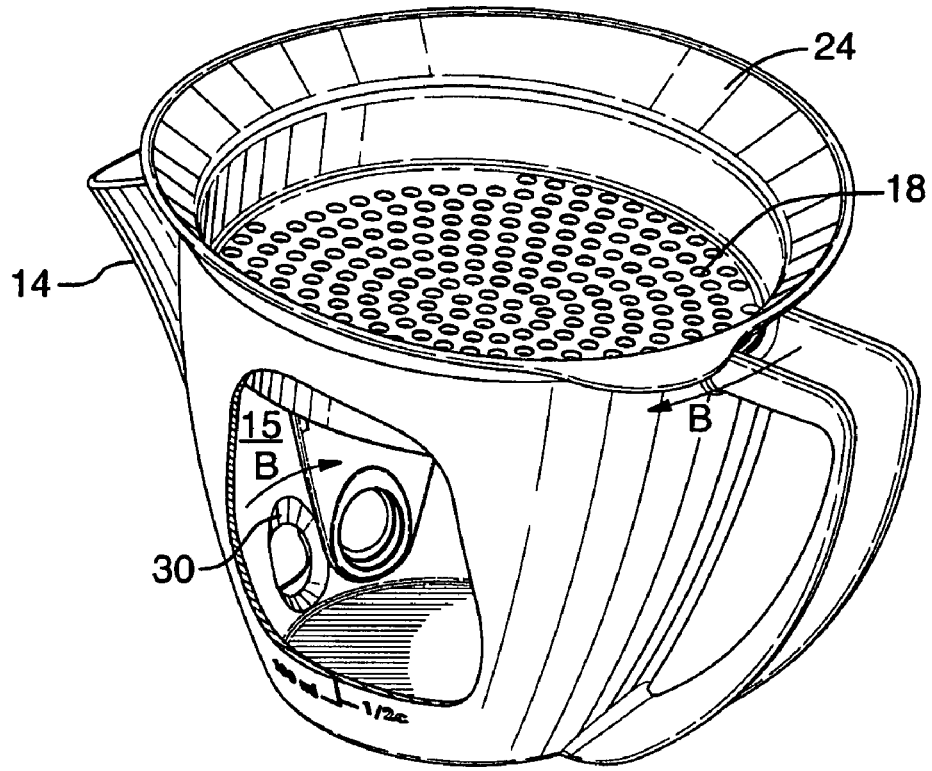
FIG. 13 is an isometric view of the fat separator device of FIG. 12 showing including a cut away portion showing a partial interior view of the fat separator device.

Once the liquid has been allowed to rest and the fat to separate to the top of the liquid the cover portion 12 may be moved to an open configuration. In one embodiment, shown in FIGS. 12 and 13, the cover portion 12 may be turned either clockwise or counter clockwise to a position that removes the protrusion 32 on the leg portion 20 from covering the aperture 30 in the internal wall portion 15 of the container 10. FIGS. 12 and 13 illustrate one example of the rotation of the cover portion 12 in the direction of arrow B to remove the protrusion 32 from the aperture 30. Once rotated the liquid is operable to flow from the container 10 through the aperture 30 and into the spout portion 14. The user can therefore pour the liquid contained in the container 10 out of the container 10, through the spout portion 14, and may stop pouring once the user sees that only fat is left in the container 10. At this point the cover portion 12 may be removed from the container 10 to allow for the removal of any collected product within the cover portion 12 and similarly the fat may be removed from the container 10.

Figure 14:
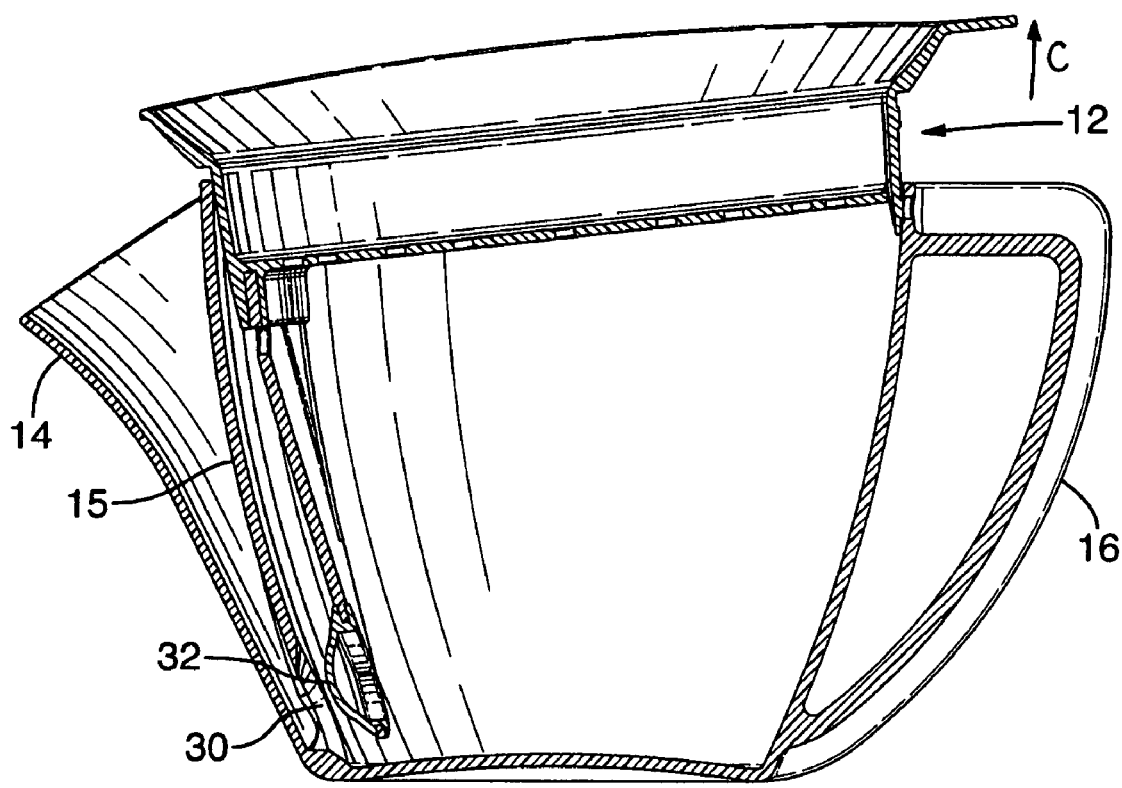
FIG. 14 is an isometric view of the fat separator device of FIG. 1 showing a second open configuration.

FIG. 14 illustrates an alternative embodiment showing a second configuration for opening and closing the cover portion 12. In this embodiment, the cover portion 12 is tilted, or flipped or placed at an angle relative to the container, to open the aperture 30 in the container 10. The cover portion 12 is operable to be placed on the container 10 as described herein. When the user wishes to pour the liquid out of the container, the user will move the portion of cover portion 12 adjacent the handle 16 upwards, in the direction of arrow C, to tilt the cover portion 12 which in turn will angle the leg portion 20 away from the spout of the container 10. The user may tilt the cover portion 12 by pressing under the external lip of the cover portion, which is illustrated as an extended lip portion in the attached figures but may simply be part of the rim of the cover portion 12, and moving the cover portion 12 upwards. It will be understood that the extended lip portion may take any form that allows for easy use by a user, for example the underside of the lip may be contoured to allow for easy placement of the thumb. However, it is not necessary to include a separate lip portion and the cover portion 12 may include a uniform lip around the peripheral edge. In the second configuration the upper projection 34 is released from the opening 36 and the lower projection 34 is received within the opening 36 to assist in maintaining the cover portion 12 in the open configuration.

The fat separator device 8 of the present invention may further comprise several internal guides located on the container 10 that correspond to channels located on the cover portion 12. These corresponding guides and channels allow for a more secure placement and fit of the cover portion 12 on the container 10. FIGS. 3 and 4 illustrate the guides and channels. As can be seen in FIG. 3 the container includes back guides 40, which may be raised portions or ridges that extent partially down the internal wall of the container 10. These back guides 40 correspond to back channels 38, seen in FIG. 4, located on the cover portion 12 either side of the projections 34. The back channels 38 are sized to be received upon the back guides 44. Likewise, the front portion of the container 10, shown in FIG. 4, includes front guides 44, only one of which is shown, that correspond to front channels 42 on the cover portion 12, shown in FIG. 3. The profile of the guides may take any form that is operable to be received within the corresponding channels, for example they may be raised ridges having rounded edges. The corresponding guides and channels are sized to extend for substantially equal lengths. Other connecting systems may be implemented that provide a secure fit for the cover portion 12 on the container 10. It will also be understood that the system of guides and channels will be preferable in the embodiment in which the cover portion is flipped or tilted to the open configuration. In the embodiment in which the cover portion is rotated the guides and channels are preferably not included.

It will be understood by this description that the fat separator device 8 not only allows for the straining of large pieces of material from any liquid required to be strained but also allows for adequate separation of the fat portion of any liquid sample from the liquid to allow a user to clearly separate the two while ensuring no fat collects in the spout of the container and therefore is not transferred out of the container when the liquid is poured out.

It will be understood that the container may not include the internal wall portion and may have a body that extends into the spout portion. In such an embodiment, the leg portion of the cover portion may be sized to be operable to block the entire spout portion on the container and maintain a separation from the body portion of the container without the requirement of an internal wall. As described above, the cover portion is operable to rotate in order to position the leg portion to either block the spout portion or unblock the spout portion, as desired.

Although the illustrated embodiment is depicted with a cover portion having a surface having a plurality of apertures thereon, it will be understood that the cover portion may not include such a surface. For example, the cover portion may fit onto the top of the container having the lip portion received around the outside of the container rim and the leg portion extending downwardly therefrom into the container without the inclusion of a surface having a plurality of apertures. The cover portion may be substantially open to allow for liquid to be poured directly into the container. In this embodiment, the leg portion still operates as described above and is operable to cover the spout portion of the container and therefore will prevent fat from entering the spout portion when the liquid is first poured into the container. Once the fat has settled to the surface of the liquid, the cover portion may be rotated, as described above, to release the leg portion from the spout portion and the liquid may be poured out of the container.

Further it will be understood that the cover portion 12 is not limited to including the number of apertures 18 illustrated in the figures. It will be understood that the plurality of apertures 18 may comprise a different pattern and/or number of apertures depending on the end use requirements. For example, the cover portion 12 may include a only apertures 18 along the surface near the side which will be located adjacent the handle portion of the container. Having a solid surface adjacent the spout portion of the container will prevent any fluid overflowing out of the container into the cover portion when the container is poured to remove the fluid from within, i.e. inhibit spillage through the cover portion. For example, the cover portion 12 may include a surface having only one half or less covered in apertures 18.

In a further embodiment the cover portion may be used and sold independently from the container and may be sized to fit a variety of measuring jugs. In this embodiment, the plug portion of the cover portion is sized to block the spout portion of such measuring jugs and operates in the same manner as described above.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

The invention claimed is:

1. A fat separator device comprising:
   a container having a body portion for receiving liquids therein and a spout portion in fluid connection with the body portion; and
   a cover portion releasably attached to the container, the cover portion including at least one aperture to allow for passage of a liquid through the cover portion and a plug portion extending down from the surface of the cover portion, the plug portion being operable to releasably cover the spout portion of the container.

2. The fat separator device defined in claim 1, wherein the cover portion is operable to rotate within the container.

3. The fat separator device defined in claim 1, wherein the cover portion is operable to tilt relative to the container.

4. The fat separator device defined in claim 1, wherein the cover portion further comprises a lip portion extending around the periphery of the surface.

5. The fat separator device defined in claim 1, wherein the cover portion comprises a plurality of apertures.

6. The fat separator device defined in claim 1, wherein the cover portion includes a perforated surface.

7. A fat separator comprising:
   a container having a body including an opening and a handle portion and a spout portion; and
   a cover portion mountable on the container at the opening, the cover portion comprising a surface portion having a plurality of apertures operable to allow for the passage of fluid through the cover portion into the container, and a plug portion extending away from the surface, the plug portion being operable to cover the spout portion when the cover portion is mounted on the container.

8. The fat separator defined in claim 7, wherein the container comprises an internal wall located between the spout portion and the body portion, the internal wall containing an aperture at a lower portion thereof.

9. The fat separator defined in claim 8, wherein the plug portion is operable to be received on the opposing side of the internal wall from the spout portion.

10. The fat separator defined in claim 8, wherein the plug portion comprises a projection at a lower end thereof sized to be received in the aperture of the internal wall.

11. The fat separator defined in claim 8, wherein the cover portion is operable to rotate between a first position in which the projection is received within the aperture and a second position in which the aperture is free from the projection.

12. The fat separator defined in claim 7, wherein the cover portion is operable to rotate between a first position in which the plug portion covers the spout portion and a second position in which the spout portion is free of the plug portion.

13. The fat separator defined in claim 7, wherein the cover portion is operable to be angled relative to the container between a first position in which the plug portion covers the spout portion and a second position in which the spout portion is free of the plug portion.

14. In a container having a spout portion, the improvement comprising a fat separator for use on said container, the separator comprising:
   a surface portion having a plurality of apertures therein to allow for passage of liquid therethrough; and a plug portion extending from the surface and operable to cover the spout portion of the container when the fat separator is received thereon.

15. A method of separating fat comprising:

fitting a cover to a container having a pouring spout in a position to prevent the flow of liquid into the pouring spout;

pouring liquid containing fat into the container and allowing fat to separate to the top of the liquid;

adjusting the cover to permit the liquid below the fat to flow to the spout; and pouring out the liquid below the fat.

* * * * *